Aug. 24, 1948.　　　　G. W. DUNHAM　　　　2,447,641
TOASTER
Filed June 22, 1944　　　　　　　　　　　　4 Sheets-Sheet 1
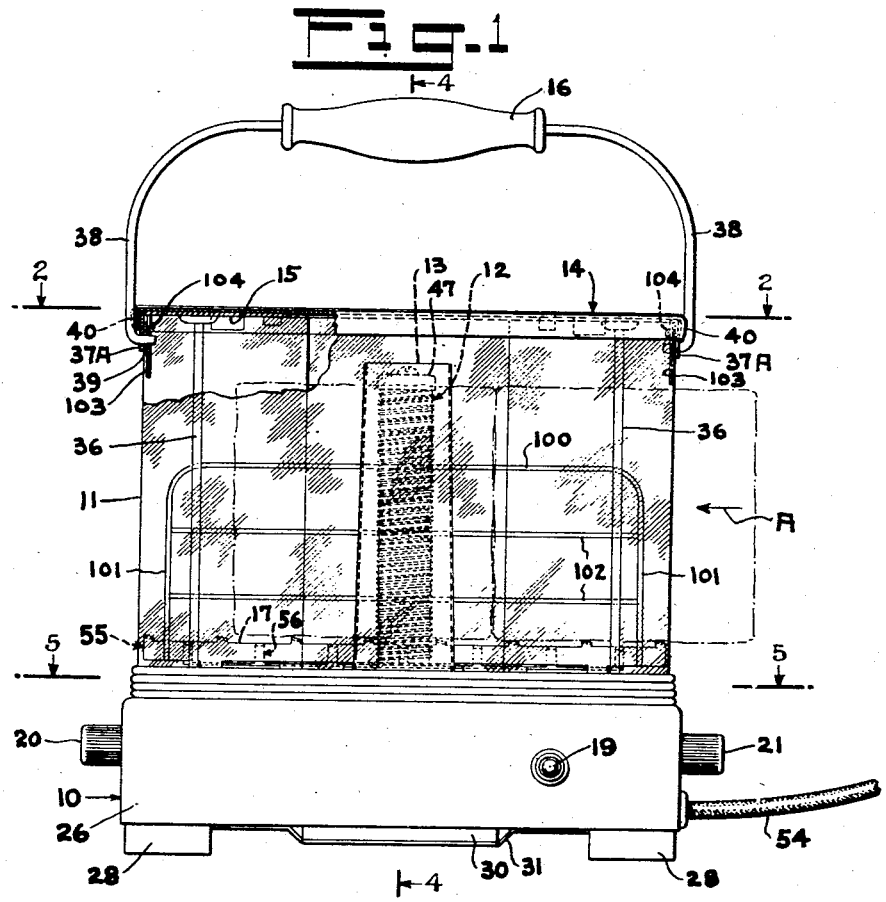
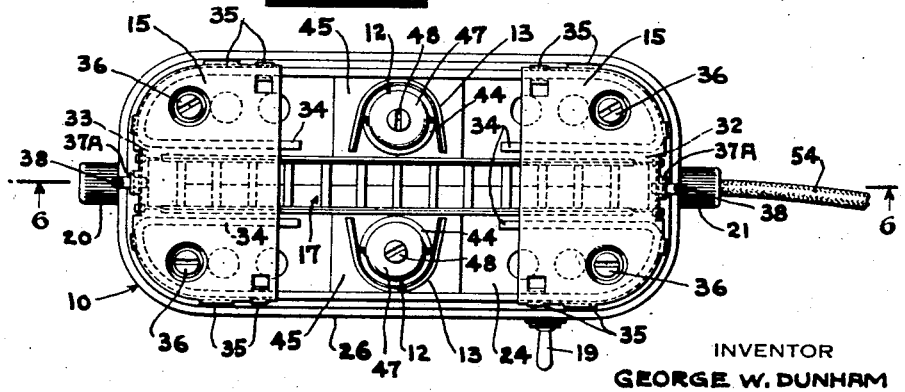
INVENTOR
GEORGE W. DUNHAM
BY
ATTORNEY Aug. 24, 1948.  G. W. DUNHAM  2,447,641
TOASTER
Filed June 22, 1944  4 Sheets-Sheet 2

INVENTOR
GEORGE W. DUNHAM
BY
Albert M. Austin
ATTORNEY

Aug. 24, 1948.    G. W. DUNHAM    2,447,641
TOASTER
Filed June 22, 1944    4 Sheets-Sheet 3
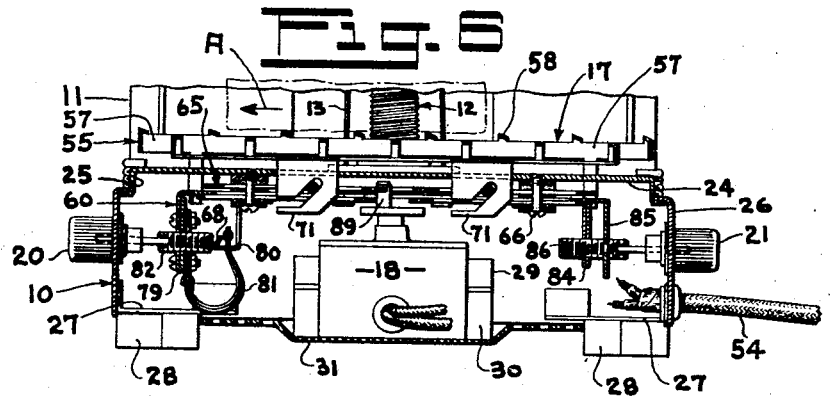
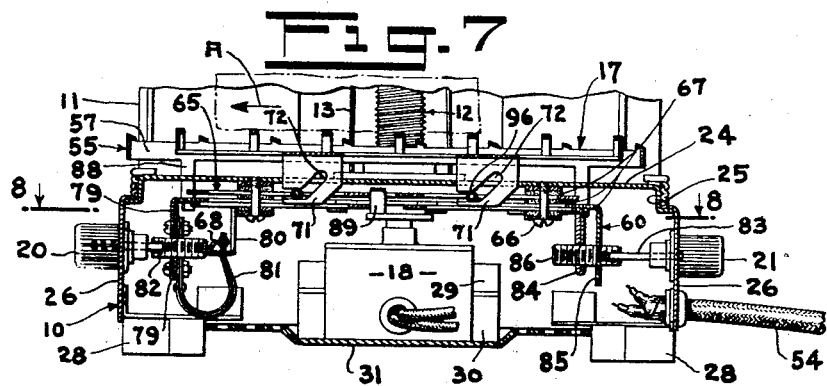
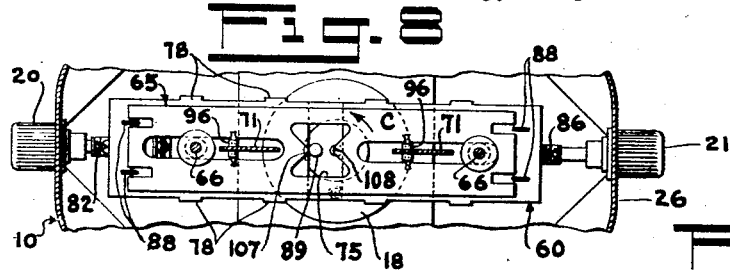
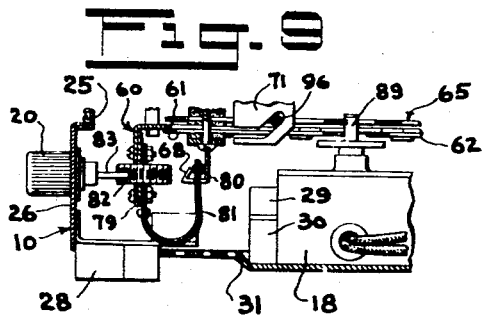
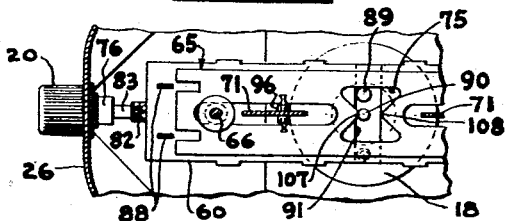
INVENTOR
GEORGE W. DUNHAM
BY
Albert M. Austin
ATTORNEY Aug. 24, 1948.                G. W. DUNHAM                2,447,641
                                  TOASTER
Filed June 22, 1944                                    4 Sheets-Sheet 4
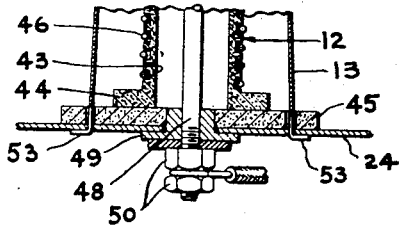
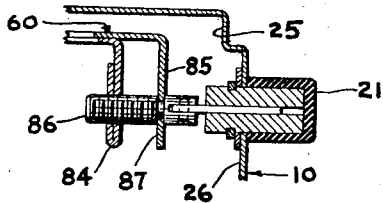
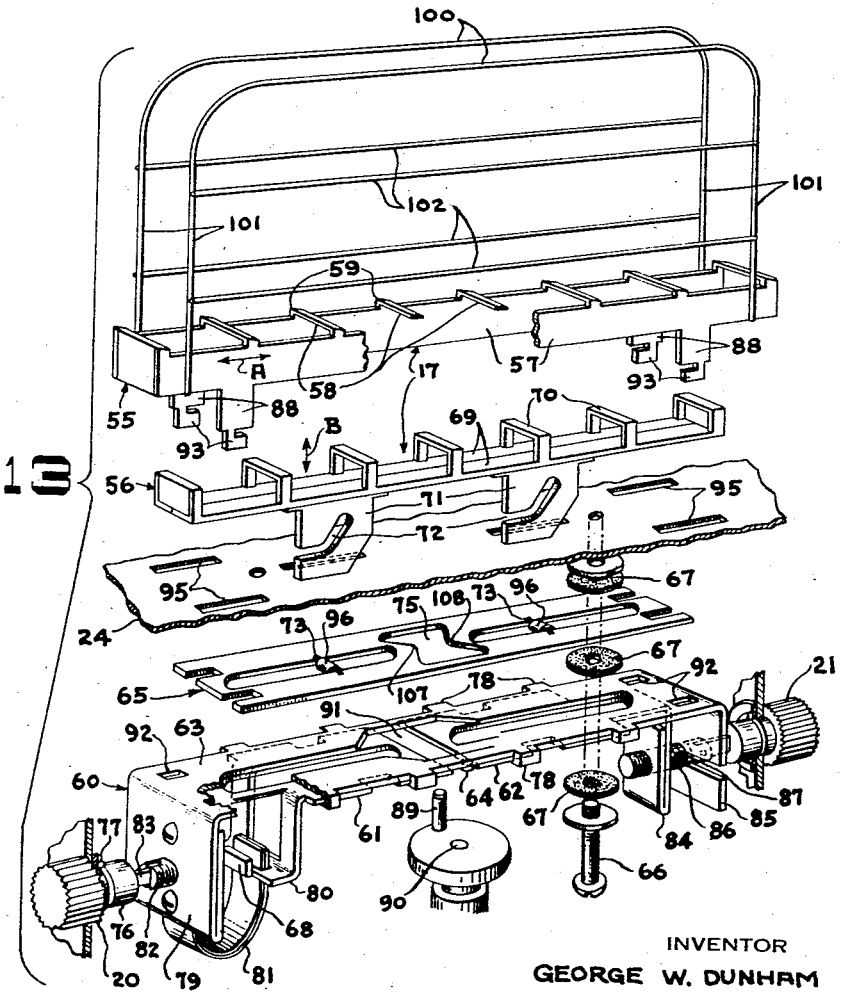
INVENTOR
GEORGE W. DUNHAM
BY
Albert M. Austin
ATTORNEY Patented Aug. 24, 1948

2,447,641

UNITED STATES PATENT OFFICE 2,447,641

TOASTER

George W. Dunham, Westport, Conn., assignor to Ruth Ralston Dunham, Westport, Conn.

Application June 22, 1944, Serial No. 541,521

2 Claims. (Cl. 99—386)

This invention relates to toasters such as used in homes for toasting bread and the like. Prime objects of the invention are to provide a toaster of the household type which is efficient in use, simple to operate and inexpensive to make.

According to a preferred embodiment of the invention, the toaster comprises briefly, an oven made up of a base, side walls, end walls, and a top wall. A conveyor is mounted on the base for conveying the toast edgewise through the oven from a restricted inlet passage to a restricted outlet passage. The inlet and outlet passages may be provided with comparatively long vestibule or corridor walls and, if desired, depending swinging curtains to conserve heat. Disposed on either side of the conveyor, and forming a restricted heating zone, is a heater comprising a hollow insulator tube of low heat storage capacity with a suitable electric resistance winding thereon. Suitable reflectors are provided on the outer sides of the heaters to direct the heat on the bread slices as they pass between the heaters through the localized heating zone.

The conveyor may comprise a set of reciprocating rack members, one of which executes a longitudinal back and forth horizontal motion parallel to its length, and which may be called a translator, the other of which executes a back and fro vertical motion transversely of its length, and which may be called an elevator. The driving mechanism may comprise a horizontal elevator slide plate reciprocated lengthwise and horizontally and having suitable cam and follower connection with the elevator to reciprocate it vertically. The translator may be driven by a suitable translator slide comprising a main plate having a thermal adjusting plate and a manual adjusting plate adjustably secured thereto. Horizontal reciprocating motions are imparted to the elevator slide and to the translator slide by a motor driven crank mechanism working in a cam slot in the elevator plate and in a speed control slot in the translator slide formed by the edges of the thermal and manual adjusting plates.

The amplitude of movement of the translator slide is controlled by the width of the translator speed control slot which in turn is controlled both by a thermal control and a manual control. A control knob is provided for the manual control and a control knob and a thermostatic element is provided for the thermal control. The manual control knob is for the purpose of adjusting the throw of the translator and hence the rate of travel of toast through the oven to obtain a darker or lighter toast as desired. The thermostatic adjustment controls the amplitude of translator movement but operates only during the warming up period, giving a slower feed while the toaster is cold and a faster feed when the toaster is warm. The thermostatic manual adjustment is for modifying the action of the thermostat if desired.

If desired, a suitable handle may be provided for carrying the toaster. The handle is preferably in the form of a bail hingedly connected to the top of the toaster, the toaster having a holder for holding the bail upright during use and yet permitting the handle to be folded down when the toaster is stored away. Handles may be provided on the toaster base instead of the bail or both bail and base handles may be provided together.

The side walls of the toaster may be made of metal or glass or other transparent material to permit observation of the toasting operation and to improve the appearance. The top of the toaster may be removable for cleaning. Suitable guide rails may be secured to the conveyor for guiding the bread slices through the oven in such manner that no guide marks will show on the finished toast.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is a side elevation of the toaster according to the invention;

Fig. 2 is a top plan view of the toaster with the roof or cover removed;

Fig. 6 is a longitudinal vertical section of the lower part of the toaster taken on the line 6—6 of Fig. 5;

Fig. 7 is a view corresponding to Fig. 6 illustrating the elevator at its uppermost position;

Fig. 8 is a fragmentary plan view taken on the line 8—8 of Fig. 7;

Fig. 9 is a vertical fragmentary section corresponding to Fig. 6 but with thermostatic element expanded to narrow translator slot to speed up toast travel;

Fig. 10 is a view corresponding to Fig. 5 but with the translator slot narrowed to speed up toast travel;

Fig. 11 is a detail illustrating one manner in which the heater elements may be mounted;

Fig. 12 is a detail of one of the adjusting knob mechanisms; and

Fig. 13 is an exploded perspective showing the construction and relationship of the several parts making up the conveyor mechanism.

Figure 3:
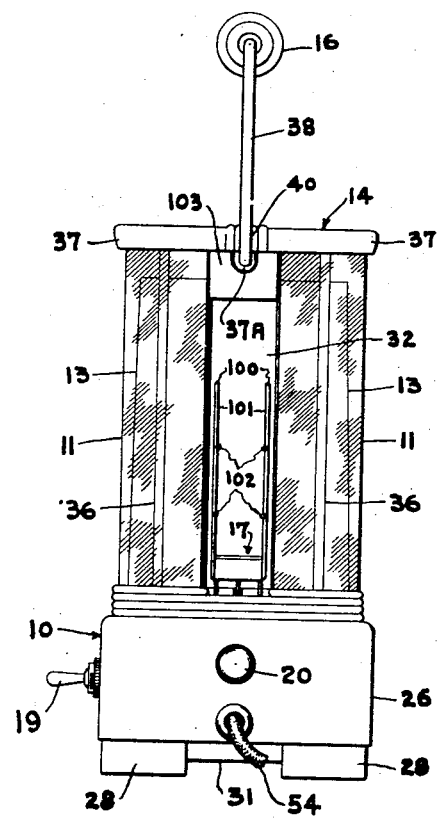
Fig. 3 is an end elevation of the toaster.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Figures 1 to 3, the toaster comprises, in general, an oven having a hollow base 10, transparent side walls 11, heater elements 12, and reflectors 13. The side walls are held in place by roof pieces 15 suitably tied to the base by long screws 36. The bail 16 is connected to the roof pieces. The toast is propelled through the oven by a conveyor 17 driven by a motor 18, mounted within the base, through suitable reduction gearing. A switch 19 also mounted on the base controls the motor and the heater elements. Adjusting knobs 20 and 21 adjust the condition of the toast as desired by the user.

In general, the toast will be fed into the inlet opening as indicated in Fig. 1, the conveyor moving the bread in the direction of arrow A through the oven where it is toasted and then is discharged from the outlet opening. As soon as the first piece of toast is advanced far enough, another piece of bread may be fed into the toaster.

Considering now the construction more in detal, the base 10 comprises a top wall or base plate 24 having a depending flange 25. A skirt member 26 tightly surrounds the flange 25 to form an integral housing to enclose the base and the mechanism therein. Angle brackets 27 are suitably secured to the skirt 26 at the corners thereof to which wooden feet 28 are suitably screwed. Additional angle members 29 are secured along the longer sides of the skirt to which blocks 30 may be secured for the purpose of supporting a perforated bottom pan 31.

Resting upon the top plate 24 are the side walls 11, these walls being bent to form end walls and being further bent to form vestibule walls 34 which in turn define the comparatively long and restricted entrance and exit corridors 32 and 33. These walls may each be made in one piece or in separate pieces and may be made either of metal or heat-resisting plastic or glass. Some transparent material is preferred to put the toasting operation under continuous observation and to improve appearance.

The walls 11 are seated within the corrugated top of skirt 26. Metal roof pieces 15 are disposed over the top edges of the walls, these top pieces having suitable tongues 35 bent down on opposite faces of the walls to engage and position the walls. Tie bolts 36 have heads seated in recesses in the top pieces 15 and pass down through the toaster and through the top plate 24 to hold the toaster in assembled condition. A top wall 14 having a depending annular flange 37 snaps on the toaster by suitable engagement with the top pieces 15 and is removable for cleaning.

Figure 4:
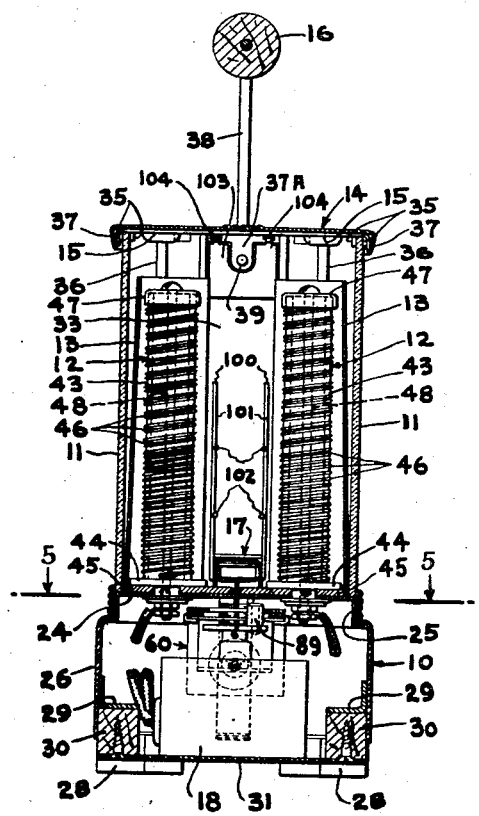
Fig. 4 is a transverse vertical section on the line 4—4 of Fig. 1.
Figure 5:
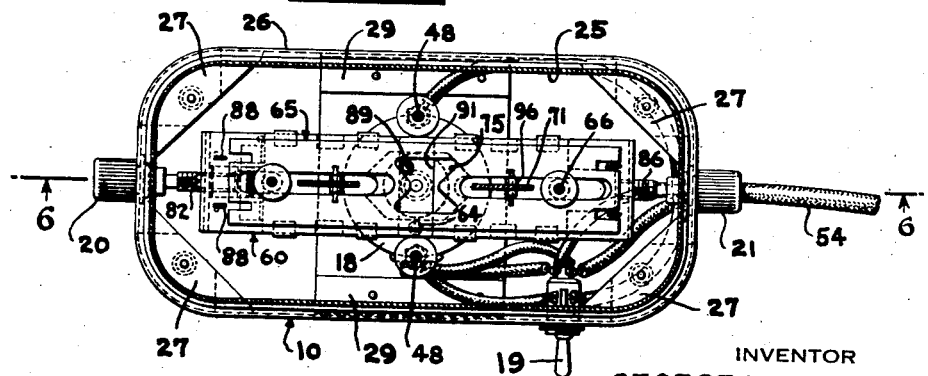
Fig. 5 is a transverse horizontal section on the line 5—5 of Fig. 4 illustrating the conveyor mechanism.

To facilitate carrying the toaster, a bail handle, indicated by 16, is provided. This bail is of conventional construction having its bent ends forming pintles engaged in holes 39 (Figs. 3 and 4) on ears depending from the top pieces 15. Notches 40 are formed in the top 14 to resiliently engage the legs 38 of the bail to hold the bail in raised position while the toaster is being used. The bail may be folded down to engage the side of the toaster for storing the toaster away on a shelf.

For supplying heat a pair of heaters 12 are provided. These heaters are disposed on opposite sides of the conveyor 17 about midway the length of the toasting passage and are for the purpose of providing controlled localized heat. Since the heaters 12 are identical, it is only necessary to describe one in detail.

Each heater 12 comprises a hollow thin-walled porcelain tube 43 of small specific heat material and small heat storage capacity to permit the toaster to heat up rapidly. The tube 43 has a base flange 44 seated upon the top plate 24 and has a helical groove in its outer surface in which the resistance wire 46 is supported. The convolutions may be disposed somewhat more closely together near the bottom of the supporting tube 43 than at the top to control the application of heat to the toast. The helical grooves may be in the form of a single or double or other multiple helix depending upon what type of heat control is applied to the resistance wires. The grooves are cut relatively deep so as to faithfully support the wires even after the wire expands with heat.

A suitable cap 47 may be applied to the top of the tube and a hold-down rod 48 may extend down through the tube and through a suitable bushing 49 seated in a hole in plate 24 and suitable nuts 50 may be applied to rod 48 to hold the heater tube 43 in secured central position.

A trough-shaped reflector 13 is mounted adjacent the tube 43 and may have suitable tongues 53 passing through openings in plate 24 and suitably bent over to hold the reflector in position. The reflector should have the proper cross-section to reflect the heat from the resistance wire in direct rays upon the toast as it passes between the heaters, and if desired, the reflectors may be tapered slightly for strength to conform to greater heat generation near the bottom of the heaters where the convolutions are closer together. The reflectors may be somewhat smaller near the top than at the bottom. The reflectors 13 may be of suitably mirrored metal to obtain optimum heat reflection, as will be understood by those skilled in the art.

Mounted upon the base 10 is a tumbler switch 19 which may be used for controlling the heat to the heater elements 12 and power to the drive motor 18. A lead cord 54 supplies the electrical energy. The toaster may be wired to supply one heat, in which case the switch 19 will have merely an on-and-off position. If desired, the heater elements may be wired to supply two heats, in which case the tumbler switch 19 will be a double throw switch. Power will be supplied to the motor regardless of the heat applied and when the switch is in its "off" position all power is cut off from the heaters and from the motor.

Considering now the conveyor mechanism, the conveyor 17 comprises essentially a translator 55 and an elevator 56. The translator reciprocates horizontally as indicated by arrow A in Fig. 13, while the elevator reciprocates vertically as indicated by the arrow B in Fig. 13. While the translator is moving in the direction of the arrow A, the elevator is down so that the translator can carry the toast along. When the translator is moving backwards, the elevator is raised so that the toast is not moved backward with the translator.

The translator 55 comprises in general side rails 57 connected by rungs 58 having sharpened forward edges 59 and depending legs 88 passing through lengthened slots 95 in the base plate 24. The legs 88 pass through holes 92 in the main plate 63 of conveyor slide 60 after which the tongues 93 are bent to hold the translator 55 in rigid connection to the main plate 63.

The conveyor slide 60 comprises, besides main plate 63, adjustable thermal plate 61 and manual adjustable plate 62. Main plate 63 has depending flanges 79 and 85. Slidably mounted under the main plate 63 are the thermal adjusting plate 61 and the manual adjusting plate 62. The top plate 63 has lugs 78 on its side edges bent around the adjusting plates 61 and 62 to hold these parts in assembled relationship and yet permit the adjusting plates 61 and 62 to be moved longitudinally with respect to top plate 63 to vary the width of control slot 91 formed by the adjacent edges of the two plates. The top plate 63 has a stop 64 to limit the minimum width of control slot 91 which is varied for adjustment purposes as explained hereinafter.

The conveyor slide 60 is supported by suitable bolts 66 extending through the base plate 24 and through slots in the constituent plates 61, 62 and 63. These supporting bolts 66 also support elevator slide 65, suitable graphite washers 67 being provided between the several plates and the heads on the lower end of the supporting bolts 66 to provide a lubricated low friction slide support for the several operating plates.

The elevator 56 comprises bottom rails 69 connected by bridge-shaped rungs 70 adapted to be disposed between the rungs 58 of the translator. Depending from the rails 69 are cam plates 71 having cam slots 72 adapted to engage follower rollers 96 on rods 73 traversing the slots in elevator slide 65. The elevator slide also has a cam control opening 75 by which it is reciprocated horizontally by means described hereinafter.

The size of operating slot 91 on the conveyor slide 60, and hence the rate of movement of the toast, is controlled by a thermostat and by knobs 20 and 21. Knob 20 constitutes an adjustable thermal control and knob 21 constitutes merely a manual control. The adjustable thermal control comprises a U-shaped bimetallic strip 81 anchored to depending flange 79 and to a further depending flange 80 on plate 61. A bolt 82 is threaded in flange 79 and adapted to engage an abutment 68 on flange 80.

The knob 20 comprises a shank 76 swiveled in a hole in the side of base 10 and held in position by a snap ring 77 disposed in a groove in the shank. The shank 76 has a square or other non-circular hole in which is slidably mounted a spindle 83 of similar cross-section, the spindle 83 being suitably secured as by a pin to bolt 82. The purpose of this construction is to permit rotation of adjusting bolt 82 by knob 20 and yet permit the conveyor slide 60 to reciprocate horizontally.

The manual adjustment by knob 21 is similarly controlled by a bolt 86 threaded into depending flange 84 on plate 62. Bolt 86 has a groove 87 fitting in a slot in depending flange 85 on conveyor slide 60. The bolt 86 is connected to knob 21 by a shank and spindle arrangement and the knob 21 is rotatably mounted in the base both in a manner similar to corresponding parts relating to knob 20.

The translator 55 is given its horizontal reciprocation and the elevator 56 its vertical reciprocation by horizontally driving both elevator slide 65 and conveyor slide 60 back and forth horizontally. This is done by a crank 89 on shaft 90 operating in cam hole 75 of elevator slide 65 and in adjustable slot 91 of conveyor slide 60. The drive shaft 90 is driven by the motor 18 through suitable reduction gears so that, for example, the crank rotates at about 20 R. P. M. with a 100 R. P. M. motor. The motor may be suitably supported by the base and may rest upon bottom pan 31.

It will be seen that, as the crank 89 rotates in the direction of arrow C (counter-clockwise in Fig. 8), it moves the control slot 91 back and forth. When the slot is contracted to a smaller size as shown in Fig. 10, there is less lost motion and the translator has greater amplitude of motion. The greater the size slot 91 becomes, the more lost motion obtains and the less the movement of the translator and hence the less the rate at which the toast is fed through the oven.

There is no corresponding adjustment in the working of crank 89 in cam opening 75. As the crank 89 rotates, it alternatively engages cam abutments 107, 108 of the cam opening 75, causing elevator slide 65 to reciprocate horizontally. The reciprocation of follower rolls 96 horizontally working in cam slots 72 and the constraining of cam ears 71 to vertical movement by the slots in the base 24 causes the elevator 56 to reciprocate vertically.

Thus there is a fixed amplitude of vertical reciprocation of the elevator, and a variable amplitude of horizontal reciprocation of the translator. The phase relationship between translator and elevator movements is such that the elevator has raised the toast off of the translator while the translator is partaking of its retrograde or backward movement and the elevator is in its downward position permitting toast to rest on the sharpened edges 59 of the translator when the latter is partaking of its forward movement.

To hold the toast upright as it is being guided through the oven, guards 100 are provided on either side of the conveyor. These guards may be made of wire stock suitably soldered or welded together. They comprise a top rail 100 and vertical posts 101 bent to shape as shown, and intermediate rails 102. These guards may be secured either to the elevator or to the translator but preferably to the translator as illustrated.

To conserve heat, if desired swinging curtains or doors 103 are provided in addition to the long narrow inlet and outlet vestibules 32, 33. These doors 103 may be comparatively short and are hinged to swing freely by hinges formed by tongues 104 fitting in slots in the top pieces 15, clearance being provided in the curtains 103 for the ball flanges 37A. It is sufficient that these curtains hang down only far enough to come close to the average size slice of bread since most of the heat tends to escape at the top of the vestibules. In case a large piece of toast engages the curtains, they are free to swing either way.

It is thought that the operation of this toaster will be apparent to those skilled in the art from the above description. The bread slices are fed by the operator by placing upright in the inlet vestibule 32 and letting the conveyor carry the toast through the toasting zone and discharge it at the outlet vestibule 33. A plate or dish may be placed at the outlet to receive the toast as it falls out of the toaster. No further attention is necessary after placing the toast in the toaster. The "shade" knob 21 will be adjusted to give the proper complexion to the toast, either light or dark, as the user desires. The thermostat takes care of the warming up period, permitting toast of the desired complexion to be obtained as soon as the toaster is turned on without change as the toaster heats up. Thermal knob 20 can be adjusted for room temperature or for other conditions to secure the desired operation of the thermostat.

Thus a toaster is provided in which the speed of toast travel may be varied without changing the speed of the motor. It may be varied by a manual adjustment according to the shade of toast desired or it may be varied thermostatically so that the conveyor speed increases as the toaster heats up. The conveyor parts are rugged in construction and simple in operation, generally continuous travel of the toast being effected by simple reciprocating motions imparted to the conveyor parts.

The effect of the concentrated heater elements and their reflectors is to localize the heat applied to the bread slices. All of the effective radiant heat is applied to the bread as it passes through the localized zone between the heaters. At the same time the relatively long vestibules or corridors prevent undue loss of heat and form a space in which the toast is subjected to heating by convection action. Thus the bread slices are heat-treated both by convection and radiation. The use of post type heaters also permits the use of relatively long vestibules without increasing the overall length of the toaster. Proper controlled ventilation is obtained by air passing through the perforated bottom pan, holes in the base plate and the space between the removable roof and the walls of the toaster.

The thin wall tubes of low specific heat material assure minimum time lag in heating up the toaster. The deep supporting grooves efficiently support the resistance wire regardless of expansion of the wire when heated.

It will be noted particularly from Fig. 1 that the height of the heaters corresponds generally to the height of bread slices but that the width of the heaters is restricted longitudinally of toast travel so as to heat progressively the bread slices as they pass between them; also that the length of the corridors is great compared to their width and to the width of the heaters in the direction of toast travel.

The removal of the top facilitates cleaning of the toaster. The bottom pan prevents getting the fingers pinched by accidentally getting them into the mechanism. The perforations in the bottom pan also let out any crumbs which may fall through the ventilation holes in the base plate.

The restricted inlet and outlet vestibules and the end curtains help conserve heat. Graphite washers minimize friction of the slides. The bail facilitates carrying the toaster and yet falls down when it is desired to store the toaster away on a closet shelf. The horizontal guide rails leave no marks on the toast because of the up and down movement given the toast as it passes through the toaster.

The transparent sides permit visibility of the toaster operation at all times and facilitates adjustment to obtain the desired toasting effect.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a bread toaster of the household type, an oven having a horizontally extending toast passage whose cross section is comparatively tall and narrow so as to pass upstanding bread slices edgewise through the toaster, said casing having upstanding end walls which have respectively an inlet and an outlet for said toast passage, said toast passage having an inner heating zone, said zone comprising heaters one on each side of the toast passage, each heater comprising an upstanding post, electric resistance wire wrapped around said post, an upstanding trough-shaped reflector disposed about the outer side of each post remote from the toast passage to focus heat on the bread slices as they pass between said heaters, said toast passage including heat-conserving roofed corridors each relatively long in the direction of toast travel compared to its width, said corridors each extending from its respective inlet or outlet to said heating zone, and a conveyor in the toast passage for conveying said bread slices therethrough.

2. In a bread toaster of the household type, an oven having a horizontally extending toast passage whose cross section is comparatively tall and narrow so as to pass upstanding bread slices edgewise through the toaster, said oven having upstanding end walls which have respectively an inlet and an outlet for said toast passage, said toast passage having an inner heating zone, said zone comprising heaters one on each side of the toast passage, each heater comprising a vertical tube of small heat storage capacity having deep grooves in its exterior, electric resistance wire wrapped around said tube and located in said grooves, said grooves being deeper than required to seat said wire when cold so as to adequately support said wire when hot, an upstanding trough-shaped reflector disposed about the outer side of each tube remote from the toast passage to focus heat on the bread slices as they pass between said heaters, said heaters being of a height corresponding to the height of bread slices but restricted longitudinally of toast travel, said toast passage including heat-conserving roofed corridors each relatively long in the direction of toast travel compared to its width, said corridors each extending from its respective inlet or outlet to said heating zone, and a horizontally disposed conveyor at the bottom of the toast passage for conveying said bread slices therethrough.

GEORGE W. DUNHAM.

REFERENCES CITED

The following references are of record in the file of this patent:

UNITED STATES PATENTS

| Number | Name | Date |
|---|---|---|
| 825,938 | Schneider | July 17, 1906 |
| 1,363,108 | Gasaway | Dec. 21, 1920 |
| 1,391,821 | Davies | Sept. 27, 1921 |
| 1,440,643 | Strite | Jan. 2, 1923 |
| 1,522,818 | Grouleff | Jan. 13, 1925 |
| 1,667,988 | Richardson | May 1, 1928 |
| 1,963,924 | Smith | June 19, 1934 |
| 2,012,702 | Zolotas | Aug. 27, 1935 |
| 2,070,129 | Ireland | Feb. 9, 1937 |
| 2,149,566 | Anderson | Mar. 7, 1939 |
| 2,151,695 | Goddard | Mar. 28, 1939 |
| 2,188,309 | Pentecost | Jan. 30, 1940 |
| 2,238,309 | Cramer | Apr. 15, 1941 |

FOREIGN PATENTS

| Number | Country | Date |
|---|---|---|
| 338,286 | Great Britain | Nov. 20, 1930 |